May 30, 1950
C. OTTO
2,509,520
PROCESS AND APPARATUS FOR MANUFACTURE
OF AMMONIUM SULFATE
Filed Aug. 6, 1947
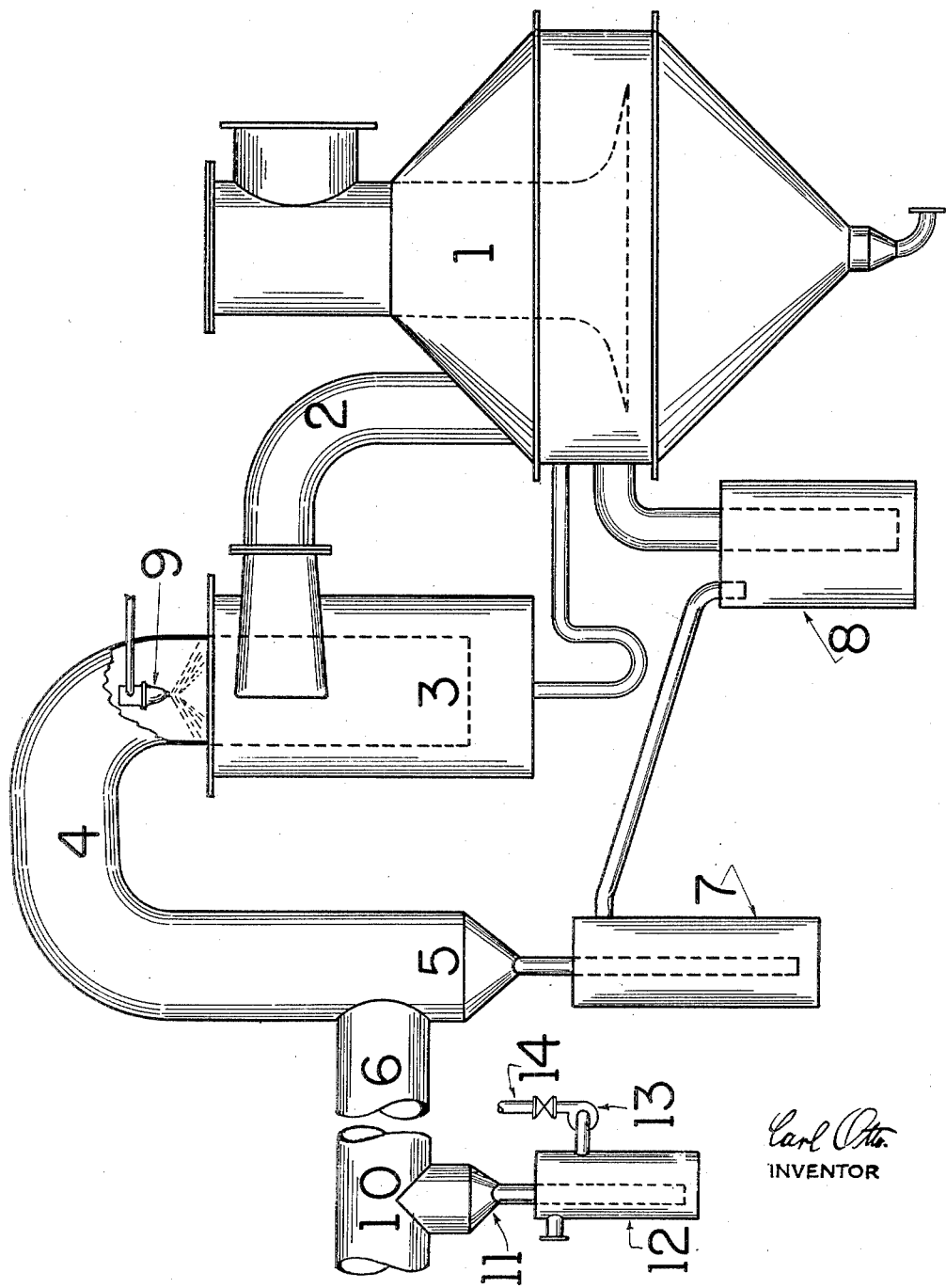
Carl Otto
INVENTOR Patented May 30, 1950

2,509,520

UNITED STATES PATENT OFFICE 2,509,520

PROCESS AND APPARATUS FOR MANUFACTURE OF AMMONIUM SULFATE

Carl Otto, Manhasset, N. Y.

Application August 6, 1947, Serial No. 766,813

2 Claims. (Cl. 23—119)

The general object of the present invention is to improve the operation of an ammonium sulphate saturator plant. This kind of a plant converts the ammonia content of coke oven gas into ammonium sulphate by passing the gas into a saturator containing a bath of weak sulphuric acid with which the gas is brought into scrubbing contact. By this contact the ammonia in the gas and the sulphuric acid in the bath combine to form sulphate of ammonia, which subsequently crystallizes out of the bath liquor. The sulphate crystals thus formed accumulate in the bath and are withdrawn from the saturator in a carrying stream of bath liquor by the discharge pump or ejector.

The ammonium sulphate saturator plant consists normally of a saturator and an acid catcher to eliminate small liquor particles which are carried with the gas stream leaving the saturator through the exit pipe. Practically all the liquor particles which are carried into the acid catcher are separated in this acid catcher from the carrying gas stream. This liquor leaves the acid catcher at the bottom outflow and is then, brought back into the saturator. It has been found in the operation of ammonium sulphate saturator plants that a very small amount of the acidified liquor is still carried with the gas stream leaving the acid catcher. These liquor particles collect at the wall of the gas pipe leaving the acid catcher and this results in corrosion of these walls after a longer or shorter period. This occurs in the first part of the gas main after the acid catcher over a length of about 30 feet. It is further known in the practice of operating ammonium sulphate saturator plants that the gas leaving the acid catcher also carries a small amount of ammonia. The amount of this ammonia is about ¼ to 1 per cent of the ammonia which was in the gas entering the saturator. After about 30 feet from the acid catcher the condensate segregating on the walls of the gas pipe is basic due to the ammonia content of the gas.

The object of this invention is further to reduce this ammonia content which is still in the gas leaving the acid catcher and on the other hand to find means to avoid corrosion by liquor particles which have collected on the walls of the pipe lines after the acid catcher.

The purpose of this invention is achieved by installing an atomizing device in the exit of the acid catcher. By this atomizing device the gas stream is loaded with a fine mist of water or basic condensate from the gas main. These fine water or condensate particles containing ammonia collected on the walls of the gas pipe and combined here with the liquor particles which consist of the acidified liquor of the saturator bath which are carried away by the gas stream leaving the exit of the acid catcher.

The ammonia in these particles combines with the sulphuric acid in the liquor particles and forms ammonium sulphate solution. This performance neutralizes the acid content of the solution covering the walls of the pipes and even makes it basic. By this any corrosion of the walls of the gas pipe is avoided. The ammonium sulphate solution flowing down at the walls of the gas pipe collects in the first of the drip pots which are provided over the length of the gas pipe leading from the acid catcher to the final gas cooler. The solution collected in the first drip pot after the exit of the acid catcher is brought back into the liquor stream of the ammonium sulphate plant.

This liquor may be brought into the overflow pot or into the mother liquor tank. Thus the ammonium sulphate content of this liquor will be recovered in the saturator.

For the better understanding of this invention, however, its advantages and specific objects with its use, reference should be made to the accompanying drawing and descriptive matter in which I have described the invention.

The drawing shows a general arrangement of an ammonium sulphate saturator plant consisting of a round saturator and acid catcher and the gas pipe connections. No. 1 shows the saturator, No. 2 shows the gas connection pipe to the acid catcher, No. 3 is the acid catcher, No. 4 shows the exit pipe from the acid catcher, No. 5 is the first drip pot after the gas has left the acid catcher, No. 6 is the continuation of the gas pipe leading the gas to the final cooler.

The bottom pipe of the drip pot 5 conducts the solution which has accumulated in this drip pot to seal pot 7 and from the seal pot 7 the liquor flows into the overflow pot 8 of the saturator. No. 9 shows the atomizing device which is arranged inside the exit gas pipe leaving the acid catcher. The amount of water or condensate from the gas main atomized in this atomizing device should be small since the part of this solution which is brought back into the saturator is to be evaporated and this requires the use of additional steam for the ammonium sulphate saturator plant.

Instead of water also condensate from the drip pot 11 of the gas main 10 before the final cooler may be used since the condensate of this drip pot contains free ammonia from the ammonia left in the gas after the acid catcher. This condensate is pumped from the seal pot 12 by the pump 13 thru pipe line 14 to the spray nozzle 9.

If water is used for the atomizing spray 9 it acts as an absorbent for the ammonia in the gas and becomes basic. This basic solution segregates on the walls of the gas pipe and combines with the small amount of liquor particles carried with the gas stream after the acid catcher. Any slight content of sulphuric acid in this carry over is thus neutralized and the solution becomes slightly basic.

If condensate from the gas pipe is used for the atomizing device 9 this condensate already contains ammonia and only a very small additional part of ammonia of the gas may be absorbed. The condensate similarly to the water segregates on the walls of the gas pipe and combines with liquor particles carried with the gas stream leaving the acid catcher. Thus any slight acid content in the carry over will be neutralized and the solution will become slightly basic.

While in accordance with the provisions of the statute I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

I claim:

1. A process for making ammonium sulphate from coke oven gas by absorbing ammonia in sulphuric acid which comprises absorbing the greater part of the ammonia from the coke-oven gas by contact with a main body of sulphuric acid containing solution, subjecting the effluent gas to a mechanical separation to remove most of the entrained solution, spraying an ammoniacal condensate from a subsequent operation on the gas into the effluent from the mechanical separation step in order to remove the last of the entrained solution, condensing an ammoniacal solution from the gaseous effluent from the spraying step, and returning the ammoniacal condensate to the spray.

2. In apparatus of the known type for producing sulphate of ammonia by scrubbing contact of distillation gas with sulphuric acid liquor comprising a scrubbing chamber with an inlet for gas to be scrubbed and an outlet for the scrubbed gas, a gas and liquid separator having a gas inlet connected to said outlet and having a gas outlet and piping connected to said separator outlet and leading away therefrom, the improvement which comprises a drip pot connected to said piping at a distance from the last mentioned outlet and arranged to receive liquid collecting in said piping, a spray nozzle in said separator outlet, and pumping means for withdrawing liquid from said drip pot and passing said liquid to said spray nozzle and thereby causing said liquor to be sprayed into said separator outlet.

CARL OTTO.

REFERENCES CITED

The following references are of record in the file of this patent:

UNITED STATES PATENTS

| Number | Name | Date |
| --- | --- | --- |
| 1,450,562 | Piette | Apr. 3, 1923 |
| 1,922,186 | Wingert | Aug. 15, 1933 |
| 1,942,050 | Davies | Jan. 2, 1934 |
| 2,409,790 | Otto | Oct. 22, 1946 |

FOREIGN PATENTS

| Number | Country | Date |
| --- | --- | --- |
| 27,878 | Great Britain | of 1908 |